INVENTORS
THOMAS E. LEWIS
ROBERT B. LIGHTNER

THEIR ATTORNEYS

INVENTORS
THOMAS E. LEWIS
ROBERT B. LIGHTNER

BY

THEIR ATTORNEYS

INVENTORS
THOMAS E. LEWIS
ROBERT B. LIGHTNER

THEIR ATTORNEYS

INVENTORS
THOMAS E. LEWIS
ROBERT B. LIGHTNER

BY

THEIR ATTORNEYS

INVENTORS
THOMAS E. LEWIS
ROBERT B. LIGHTNER

BY

THEIR ATTORNEYS

INVENTORS
THOMAS E. LEWIS
ROBERT B. LIGHTNER
BY
THEIR ATTORNEYS

United States Patent Office 3,420,429
Patented Jan. 7, 1969

3,420,429
APPARATUS FOR MAKING STRIP CONDUCTOR COILS AND THE LIKE WITH TERMINAL LEADS ATTACHED THERETO
Thomas E. Lewis, Chesterfield County, and Robert B. Lightner, Henrico County, Va., assignors to Reynolds Metals Company, Richmond, Va., a corporation of Delaware
Filed May 11, 1964, Ser. No. 366,497
U.S. Cl. 228—3           24 Claims
Int. Cl. H01f 41/04

ABSTRACT OF THE DISCLOSURE

This disclosure relates to apparatus for continuously making strip conductor coils by coiling a strip of conductive material from a supply roll onto a cylindrical core being positioned at a predetermined location in the apparatus by an indexible mandrel means, the apparatus having means for attaching two leads in side-by-side relation to the strip of conductive material intermediate the supply roll therefor and the coil being wound at the predetermined location whereby subsequently the strip of conductive material is separated between the attached leads thereof so that one of the leads will form the outer lead on the strip conductor coil and the other lead will subsequently form the inner lead on a subsequently wound conductor coil.

This invention relates to an improved apparatus for making strip conductor coils having inner and outer leads secured thereto.

It is well known that strip conductor coils can be provided wherein each coil comprises a strip of conductive material coiled on an insulating core or the like with or without a strip of insulating material disposed between adjacent coils thereof.

The inner and outer ends of the coiled strip of conductive material respectively have terminal leads attached thereto so that an electrical connection can be made to the opposed ends of the coiled strip of conductive material.

According to the teachings of this invention, means are provided for not only attaching such terminal leads to a strip of conductive material or the like to be utilized for forming a strip conductor coil or the like, but also this invention provides an improved method and apparatus for continuously forming strip conductor coils either automatically or semi-automatically as desired.

Accordingly, it is an object of this invention to provide an improved apparatus for making strip conductor coils or the like, the apparatus of this invention having one or more of the novel features set forth above or hereinafter shown or described.

Other objects, uses and advantages of this invention are apparent from a reading of this description, which proceeds with reference to the accompanying drawings forming a part thereof and wherein:

While the various features of this invention are hereinafter described and illustrated as being particularly adaptable for forming strip conductor coils or the like, it is to be understood that the various features of this invention can be utilized singly or in any combination thereof to provide other structure as desired.

Therefore, this invention is not to be limited to only the embodiment illustrated in the drawings, because the drawings are merely utilized to illustrate one of the wide variety of uses of this invention.

Figure 1:
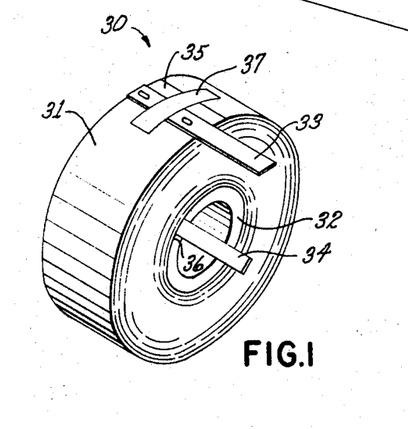
FIGURE 1 is a perspective view of a typical strip conductor coil formed according to the teachings of this invention.

Referring now to FIGURE 1, an improved strip conductor coil of this invention is generally indicated by the reference numeral 30 and comprises a strip of conductive material 31, such as a strip of aluminum containing metallic foil or the like, coiled on an insulating core 32, such as cardboard or the like, and having a pair of like terminal leads 33 and 34 respectively secured to the outer and inner ends 35 and 36 thereof in a manner hereinafter described whereby the leads 33 and 34 provide means for electrically interconnecting a source of electrical current to the coiled strip of conductive material 31 for the desired purpose.

In order to hold the outer coil of the strip of conductive material 31 in its coiled relation, a suitable piece of tape 37 is utilized in the manner illustrated in FIGURE 1, the tape 37 either being as wide as the strip of conductive material 31 or being narrower than the same in the manner illustrated in FIGURE 1, if desired.

If desired, a strip of insulating material can be coiled on the core 32 along with the strip of conductive material 31 to provide means for insulating adjacent coils of the strip of conductive material 31 from each other in a manner hereinafter described.

Therefore, it can be seen that an improved strip conductor coil 30 of this invention is provided and the method and apparatus for forming the same will now be described.

Figure 3:
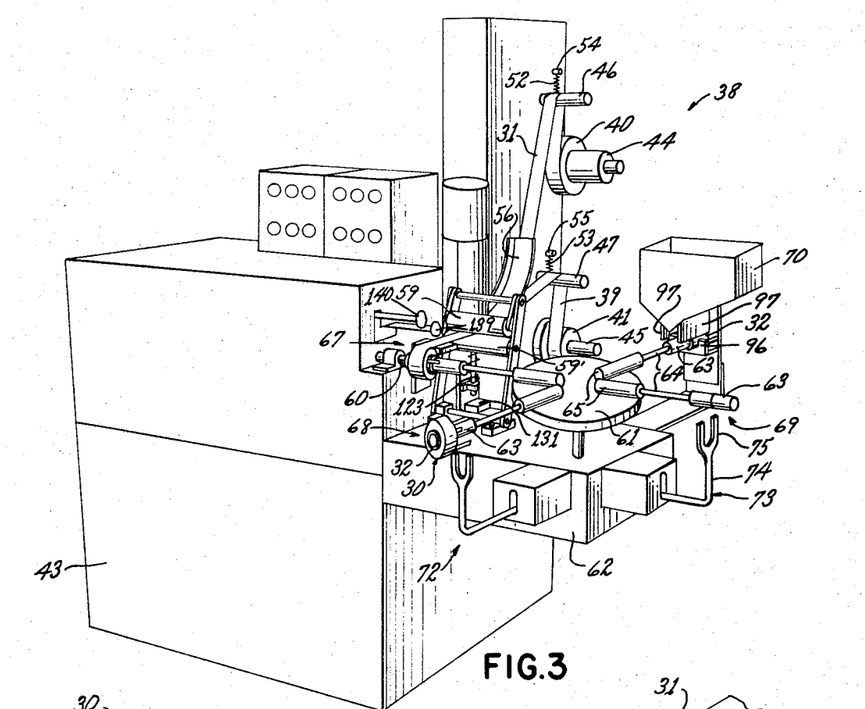
FIGURE 3 is a perspective view illustrating one embodiment of the method and apparatus of this invention.

As illustrated in FIGURE 3, the improved method and apparatus of this invention is generally indicated by the reference numeral 38 and provides means for continuously making the strip conductor coils 30 of this invention from the strip of conductive material 31 and a strip of insulating material 39 respectively drawn from free wheeling supply rolls 40 and 41 thereof in a manner hereinafter described.

Figure 2:
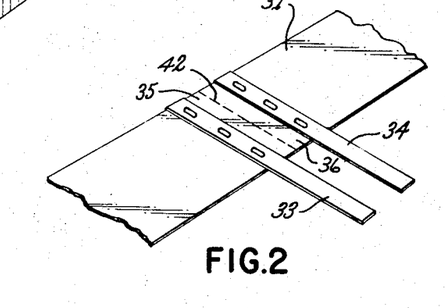
FIGURE 2 is a fragmentary, perspective view illustrating a pair of leads attached in side by side relation to a strip of conductive material in a manner according to the teachings of this invention.

As the strip of conductive material 31 passes through the apparatus 38 of this invention, means are provided to serially interconnect the leads 33 and 34 thereon in side by side relation as illustrated in FIGURE 2 while substantially simultaneously rendering the strip of conductive material 31, as well as a strip of insulating material 39, separable between the leads 33 and 34 by means of a perforated line 42 as illustrated in FIGURE 2.

In this manner, the lead 33 will form the outer lead on one strip conductor coil 30 while the lead 34 will form the inner lead on another strip conductor coil 30 when the strip of conductive material 31 is severed between the pair of leads 33 and 34 in a manner hereinafter described.

As illustrated in FIGURE 3, the apparatus 38 of this invention includes a frame structure 43 supporting the supply rolls 40 and 41 on rollers or supports 44 and 45 rotatably mounted thereto.

The strips of material 31 and 39 are respectively passed around a pair of spring loaded turning bars 46 and 47 which tend to maintain tension on the strips of material 31 and 39 as they pass through the apparatus 38.

Figure 4:
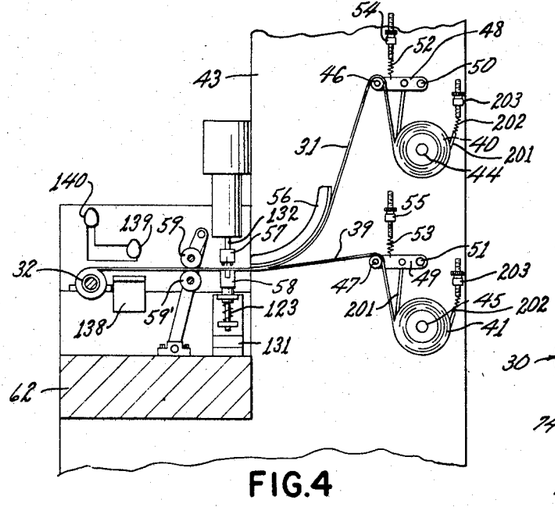
FIGURE 4 is a fragmentary, side view of the apparatus illustrated in FIGURE 3.
Figure 4A:
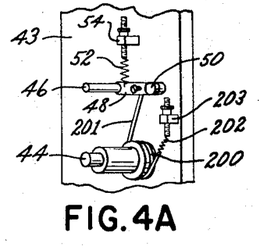
FIGURE 4A is a fragmentary perspective view of part of the apparatus illustrated in FIGURE 4.

In particular, it can be seen in FIGURES 4 and 4A that the bars 46 and 47 are respectively mounted on lever arms 48 and 49 pivoted to the frame means 43 by pivot pins 50 and 51. A pair of tension springs 52 and 53 respectively have ends interconnected to the frame means 43 by adjustable fasteners 54 and 55 and the other ends thereof respectively interconnected to the level arms 48 and 49.

Each roller 44 and 45 has an annular groove 200, FIGURE 4A, which receives a belt 201 having one end fastened to the respective lever arm 48 or 49 and the other end fastened to a tension spring 202, the tension springs 202 being adjustably fastened to the frame means 43 by adjustable fasteners 203.

Thus, as the strips of material 31 and 39 are drawn through the apparatus 38, the same tend to pull downwardly on the bars 46 and 47 in opposition to the force of the tension springs 52 and 53 whereby the levers 48 and 49 move counterclockwise and reduce the force of the tension springs 202 tending to prevent rotation of the rollers 44 and 45 by means of the belts 201. In this manner, the force of the springs 202 tending to frictionally hold the rollers 44 and 45 from rotation is reduced while the force of the springs 52 and 53 is increased to provide tension on the strips of material 31 and 39 when the same are being fed through the apparatus.

However, when movement of the strips of material 31 and 39 through the apparatus is terminated, the levers 48 and 49 are moved clockwise by the tension springs 52 and 53 to take up slack in the strips 31 and 39 and to increase the frictional force between the belts 201 and the rollers 44 and 45 whereby free-wheeling of the rollers 44 and 45 and overfeeding of the strips 31 and 39 therefrom is prevented by the belts 201.

The strip of material 31 is fed from the supply roll 40 thereof underneath an arcuate guide 56 whereby the strip of material 31 joins with the strip of material 39 to pass between a pair of die blocks 57 and 58 which perform the lead attaching means in a manner hereinafter described.

The superimposed strips of material 31 and 39 pass through the nip of a pair of rollers 59 and 59′ onto a core 32 rotated by a drive shaft 60, FIGURE 3, in a manner hereinafter described.

As the core 32 in FIGURES 3 and 4 is continuously rotated in a counterclockwise direction, the strips of material 31 and 39 are coiled thereon until the same have provided the desired number of turns on the core 32. Thereafter, the rotation of the shaft 60 is momentarily terminated and the die blocks 57 and 58 cooperate together in a manner hereinafter described to secure the leads 33 and 34 in side by side relation to the strip of conductive material 31 intermediate the supply roll 40 and core 32 in the manner illustrated in FIGURE 2.

Thereafter, the strips of material 31 and 39 are separated between the attached leads 33 and 34 at the tear line 42 in a manner hereinafter described whereby the lead 33 will form the outer lead on the strip conductor coil 30 formed on the core 32 when the shaft 60 is again rotated to wind up the remainder of the separated strips of material 31 and 39 thereon.

The lead 34 on the remaining portion of the strip 31 will, subsequently, form the inner lead on the next core 32 positioned in the apparatus 38 in a manner hereinafter described.

Figures 5, 7:
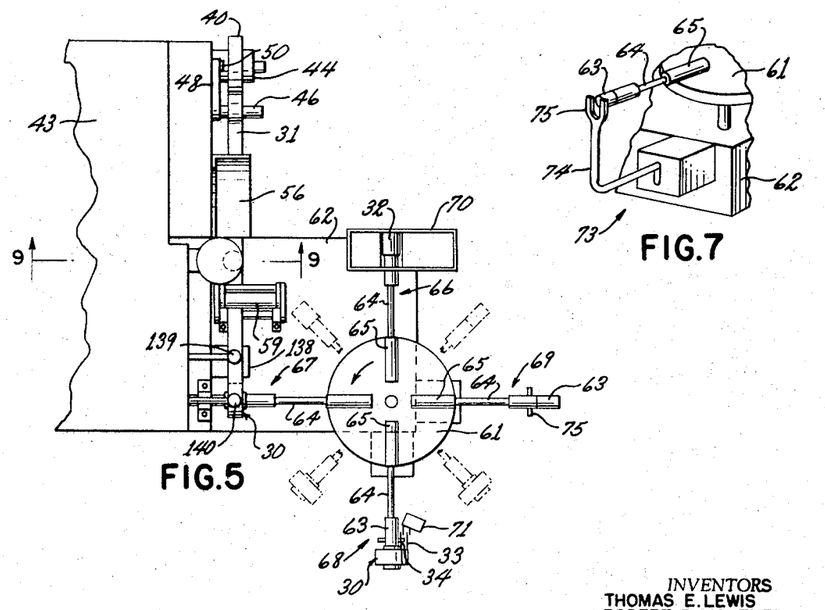
FIGURE 5 is a fragmentary, top view of the apparatus illustrated in FIGURE 3.
FIGURES 6 and 7 are respectively fragmentary, perspective views illustrating the operation of the coil stripping mechanism of this invention.

As illustrated in FIGURES 3 and 5, an indexible table 61 is carried by an outwardly directed portion 62 of the frame means 43 and carries a plurality of mandrels 63 respectively interconnected to piston rods 64 cooperating with hydraulic or pneumatic cylinders 65 secured to the table 61.

The table 61 is adapted to serially index each mandrel through four operating stations 66, 67, 68 and 69.

When the mandrels 63 are all simultaneously moved inwardly, such as to the dotted position illustrated in FIGURE 5, the table 61 is indexed to move one of the mandrels 63 to the station 66. When that mandrel 63 is moved to station 66, the piston rods 64 are simultaneously moved radially outwardly to the full line position illustrated in FIGURE 5 whereby the mandrel 63 at station 66 enters a hopper 70 and has a core 32 inserted thereon in a manner hereinafter described.

Thereafter, the mandrels 63 are moved radially inwardly relative to the table 61 by the cylinders 65 in a manner conventional in the art whereby the table 61 can be again indexed in a counterclockwise direction in FIGURE 5 to bring that core carrying mandrel 63 to the station 67.

With the core carrying mandrel 63 now at station 67, the mandrels 65 are again expanded radially outwardly to the full line position illustrated in FIGURE 5 whereby the mandrel 63 at the station 67 is now interconnected to the shaft 60 of the apparatus 38 so that the core 32 disposed thereon will be rotated to provide the strip winding operation previously described.

While the previously described mandrel is at the station 67, it can be seen that another mandrel 63 at the station 66 is picking up another core 32 to be subsequently utilized in the same manner.

After the strip conductor coil 30 has been formed on the mandrel 63 at the station 67 in a manner hereinafter described, the mandrels 63 are retracted and the table 61 is indexed to carry the completed strip conductor coil 30 to the station 68.

With that coil carrying mandrel 63 now at station 68, the mandrels 63 are again moved radially outwardly to the full line position illustrated in FIGURE 5 where it can be seen that another core is being operatively interconnected to the shaft 60 to have another strip conductor coil 30 formed thereon while the next preceding mandrel at station 66 is picking up a new core 32. The mandrel at station 68 is so positioned that an automatic testing apparatus 71 is interconnected to the leads 33 and 34 of the coil 30 to determine the resistance of the same.

If the coil 30 at the station 68 complies with the test performed by the testing apparatus 71, the stripping mechanism 72, FIGURE 3, is not actuated and the coil 30 remains on the mandrel 63.

Thereafter, when that particular coil 30 is indexed to station 69 in the manner previously described, and projected outwardly to the full line position illustrated in FIGURE 5, another stripping mechanism 73, FIGURE 3, is adapted to strip the coil 30 therefrom whereby the same can fall into a suitable hopper or the like.

However, if the particular coil 30 at the station 68 is a reject as determined by the tester 71, the stripping mechanism 72 is energized and strips the coil 30 from the mandrel 63 at the station 68 whereby the same can fall into a reject hopper.

In particular, the stripping mechanism 72 and 73 are substantially the same whereby only the details of the stripping mechanism 73 will now be described and reference is made to FIGURES 6 and 7, it being understood that the operation and details of the stripping mechanism 72 is the same as the stripping mechanism 73.

Figure 6:
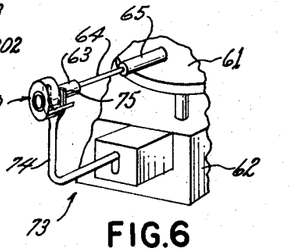

As illustrated in FIGURES 6 and 7, the stripping mechanism 73 includes an L-shaped arm 74 having a yoke-shaped end 75 adapted to be moved vertically upwardly from a position illustrated in FIGURE 3 to the position illustrated in FIGURE 6 when a particular core carrying mandrel 63 is disposed at the station 69 and is in its outward position. In this manner, the yoke end 75 of the stripping means 73 is adapted to telescopically receive the mandrel 63 intermediate the coil 30 and the table 61 in the manner illustrated in FIGURE 6 while the mandrel 63 is at its outermost position at the station 69.

With the yoke end 75 of the arm 74 held in the up position as illustrated in FIGURE 6, subsequent contraction of the particular piston and cylinder arrangement 64 and 65 causes the mandrel 63 at the station 69 to be drawn inwardly in the manner illustrated in FIGURE 7 whereby it can be seen that the yoke end 75 of the arm 74 will strip the strip conductor coil 30 from the mandrel 63 so that the same can drop by gravity into a suitable hopper or the like whereby the mandrel 63 is then adapted to pick up another core 32 when the same is advanced to the station 66 in the manner previously described.

Therefore, it can be seen that as a completed strip conductor coil 30 is formed at station 67 and moved to station 68, the same is tested by the apparatus 71 which, if it finds the same to be a reject, operates the stripping mechanism 72 to strip the rejected coil 30 from the particular mandrel 63 in the manner illustrated in FIGURES 6 and 7.

However, if the testing apparatus 71 determines that the particular strip conductor coil 30 is not a reject, the stripping mechanism 72 is not actuated and the particular mandrel 63 is subsequently advanced to the station 69 whereby the coil 30 thereon is adapted to be stripped therefrom by the stripping mechanism 73.

The particular details of each of the mandrels 63 will now be described and reference is made to FIGURES 17–19 of the drawings.

Figure 17:
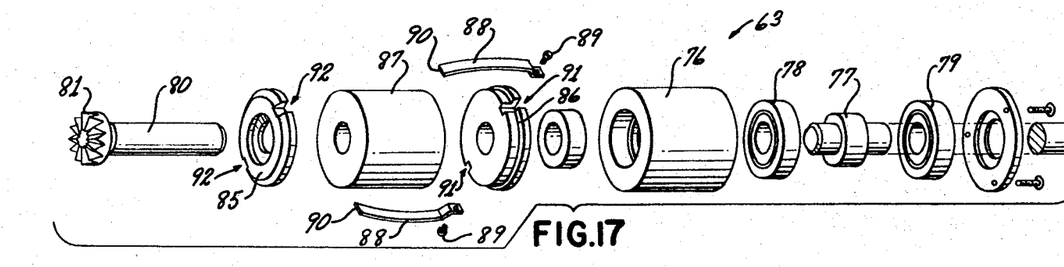
FIGURE 17 is an exploded perspective view of one of the mandrels of this invention.
Figure 18:
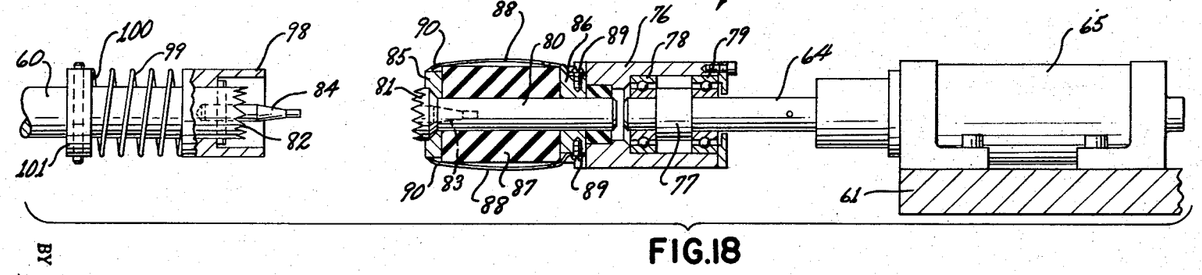
FIGURE 18 is a cross-sectional view of an assembled mandrel of this invention before the same is interconnected to the drive mechanism of the apparatus of this invention.
Figure 19:
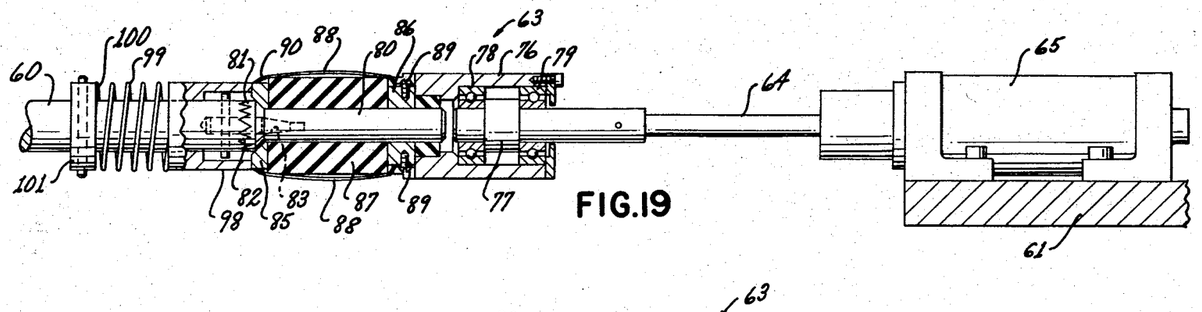
FIGURE 19 is a view similar to FIGURE 18 and illustrates the mandrel of this invention interconnected to the drive mechanism.

As illustrated in FIGURES 17–19 of the drawings, each mandrel 63 comprises a housing 76 rotatably mounted on an enlarged end 77 of one of the pistons 64 by suitable bearing means 78 and 79 whereby each mandrel 63 is rotatable relative to its respective piston rod 64.

A shaft 80 is carried by each housing 76 of each mandrel 63 and projects outwardly therefrom, each shaft 80 having a gear-shaped clutch member 81 at the outer free end thereof to be engagable with a gear-shaped clutch member 82 carried on the rotatably driven shaft 60 of the apparatus 38 in the manner illustrated in FIGURE 19.

In particular, each rod 80 has a tapering bore 83 formed in the outer end 81 thereof and adapted to telescopically receive a tapering projection 84 of the shaft 60 when the particular mandrel 63 is at the station 67 and is moved outwardly by the particular cylinder 65 as illustrated in FIGURE 19 whereby engagement of the clutch members 81 and 82 causes the mandrel 63 to rotate in unison with the shaft 60 when the shaft 60 is rotated for the purposes previously described.

A pair of retainers 85 and 86 are respectively disposed on the shaft 80 of each mandrel 63 in the manner illustrated in FIGURE 19 and are spaced from each other by a cylinder or sleeve 87 formed of resilient material, the retainer 85 being movable toward the retainer 86 to compress the resilient material 87 and being limited in its outward movement by the enlarged head 81 of the respective shaft 80.

A plurality of leaf springs 88 are disposed outside of the resilient sleeve 87 and are respectively secured to the retainer 86 by fastening members 89, the free ends 90 of the spring fingers 88 extending beyond the resilient sleeve 87 in the manner illustrated in FIGURE 18.

As illustrated in FIGURE 17, the retainer 86 has a plurality of notches 91 to receive the right hand ends of the springs fingers 88 while the retainer 85 has corresponding notches 92 to receive the ends 90 of the spring fingers 88.

Figure 8:
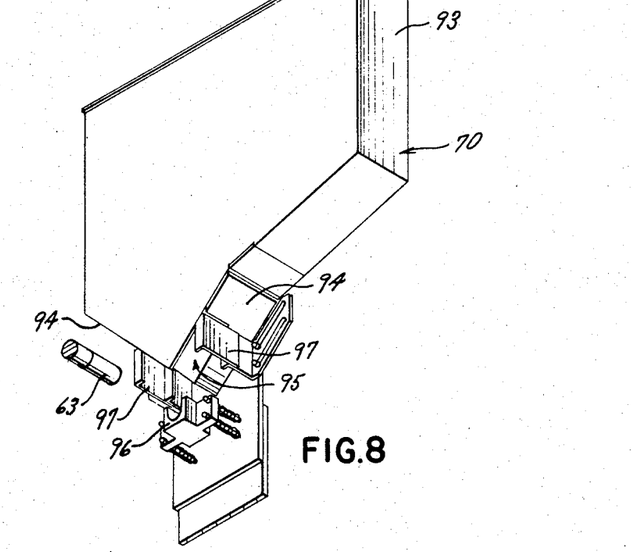
FIGURE 8 is a perspective view illustrating the core feeding hopper of this invention.

The spring fingers 88 are utilized to permit the respective mandrel 63 to pick up a particular core 32 from the hopper means 70 in the manner illustrated in FIGURES 3, 5 and 8.

In particular, the hopper 70 comprises an enlarged chamber defining structure 93 for receiving a plurality of cores 32 with their axes disposed substantially horizontally whereby the same will be serially guided downwardly by the slanted walls 94 of the hopper structure 93 and through a slot 95 into a semi-circular retainer 96, the slot 95 being defined by a pair of adjustable bracket members 97 disposed in their outermost position in FIGURE 8 to facilitate viewing of the hopper means 70.

Thus, it can be seen that the hopper means 70 feeds one core 32 at a time into the semi-circular retainer 96 which is positioned relative to the table 61 in such a manner that when a mandrel 63 is moved to station 66 and moved radially outwardly in the manner previously described, the mandrel 63 will be inserted into the core 32 whereby the spring fingers 88 of the mandrel 63 will be flexed inwardly by the telescoping relation with the core 32 and cause the same to remain on the mandrel 63 when the mandrel 63 is again retracted to be advanced to station 67.

When that particular mandrel 63 is advanced to station 67 and moved radially outwardly by the particular cylinder 65 to engage the clutch members 81 and 82, it can be seen that the retainer 85 of the particular mandrel 63 engages an annular flange of a retainer 98 carried by the shaft 60 and being spring loaded to the right in FIGURES 18 and 19 by a compression spring 99 having one end 100 thereof held stationary against a retainer 101 secured to the shaft 60.

Thus, the force of the compression spring 99 tending to urge the annular flanged retainer 98 to the right to the position illustrated in FIGURE 18 causes the retainer 85 of the particular mandrel 63 to be urged toward the retainer 86 thereof to compress the resilient member 87 whereby the resilient member 87 expands radially outwardly under the force of the compression spring 99 to cause the same to frictionally engage the internal peripheral surface of the core 32 to hold the same fro mrelative movement during the rotation of the mandrel 63 by the shaft 60. In this manner, it can be seen that the core 32 is positively held from movement relative to the mandrel 63 when the mandrel 63 is rotated because of the outward expansion of the resilient member 87 by the member 98 of the shaft 60.

However, when the particular mandrel 63 is moved radially inwardly from the station 67, it can be seen that the resilient member 87 can move the retainer 85 away from the retainer 86 and will be collapsed so that the completed coil 30 thereon will only be retained on the mandrel 63 by the spring fingers 88 whereby it is relatively simple operation to strip the completed coil 30 from the mandrel 63 by the stripping means 72 or 73 in the manner previously described.

Thus, it can be seen that as the free ends of the strip of material 31 and 39 are secured to a core 32 disposed at the station 67 in a manner hereinafter described, rotation of the shaft 60 causes the strips of material 31 and 39 to be wound thereon until a sufficient number of turns have been formed on the particular core 32.

For example, a suitable sensing device could be so located at the station 67 that the same can determine when a sufficient number of turns of the strips of material 31 and 39 have been applied thereon and that the inner lead 34 thereof is in a desired rotational position whereby further rotation of the shaft 60 can be terminated so that the die blocks 57 and 58 can secure the leads 33 and 34 thereon at the proper position so that when the strips of material 31 and 39 are properly separated between the leads 33 and 34 thereof, the lead 33 will subsequently be disposed on the core 32 in the desired position relative to the inner lead 34 thereof to not only permit the testing apparatus 71 to function in the manner previously described, but to also satisfy the lead location requirements of the particular application of the completed coil 30.

In particular, when the shaft 60 has ceased to rotate, the die blocks 57 and 58 are adapted to cold weld the leads 33 and 34 thereto in a manner now to be described.

As illustrated in FIGURES 9–16, the frame structure 43 has a horizontally disposed frame means 102 for supporting two strips of lead material 103 disposed in side by side relation, the strips of lead material 103 being held against the frame means 102 by an upper frame means 104 cut away at 105 to permit a lead feeding mechanism 106 to operate in the manner hereinafter described.

The lead feeding structure 106 is adapted to feed the strips of lead material 103 from the position illustrated in FIGURE 9 to the position illustrated in FIGURE 11 whereby the lead material 103 projects beyond the strip of conductive material 31 a predetermined distance to form the leads 33 and 34 when the projected portions of the lead material 103 are severed in a manner hereinafter described, the lead material 103 being fed outwardly to the right in FIGURES 9–13 between the separated die blocks 57 and 58.

The lead materials 103 are respectively adapted to be fed from supply rolls thereof along the frame structure 102 by the pusher 106.

Figure 9:
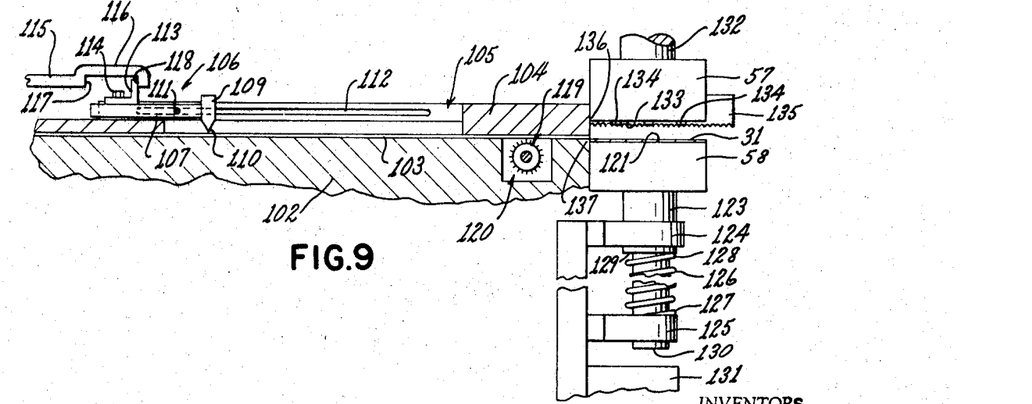
FIGURE 9 is an enlarged, fragmentary, cross-sectional view taken on line 9—9 of FIGURE 5 with background structure removed.
Figure 16:
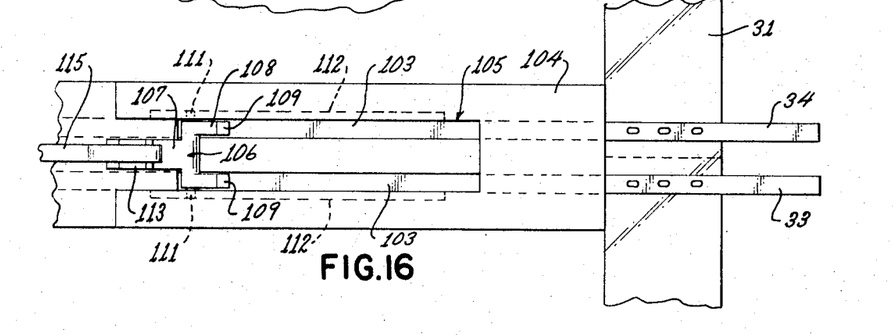
FIGURE 16 is a top view taken substantially on line 16—16 of FIGURE 14.

In particular, the pusher 106 comprises an elongated portion 107, FIGURES 9 and 16, having a yoke-shaped end 108 provided with a pair of downwardly extending pushing members 109 respectively having lead engaging pointed ends 110 in the manner illustrated in FIGURE 9. The elongated portion 107 of the pusher 106 has outwardly directed pivot pins 111 extending therefrom and respectively received in horizontally disposed slots 112 formed in the frame structure 104 at the cutout 105 thereof.

An adjustable L-shaped member 113 is carried by the elongated portion 107 of the pusher 106 and can be adjusted relative thereto upon loosening of the fastening means 114 for a purpose hereinafter described.

An arm 115 is carried by the apparatus 38 and is adapted to be moved to the right and to the left by a suitable hydraulic or pneumatic piston and cylinder arrangement or by mechanical ram means, if desired.

The arm 115 has a yoke-shaped portion 116 adapted to surround the L-shaped member 113 of the pusher 106 in the manner illustrated in FIGURE 9 whereby the arm 115 has spaced surfaces 117 and 118 for respectively engaging the L-shaped member 113 of the pusher 106 in a manner now to be described.

When it is desired to feed the lead material 103 outwardly between the die blocks 57 and 58 to form the leads 33 and 34 in a manner hereinafter described, the arm 115 is moved to the right from the position illustrated in FIGURE 9 until the surface 117 thereof engages the L-shaped member 113 of the pusher 106 and causes the pusher 106 to tend to rotate in a clockwise direction about the pivot pins 111 thereof in the manner illustrated in FIGURE 10 whereby the tips 110 of the pushing members 109 respectively engage the strips of lead material 103.

Figure 10:
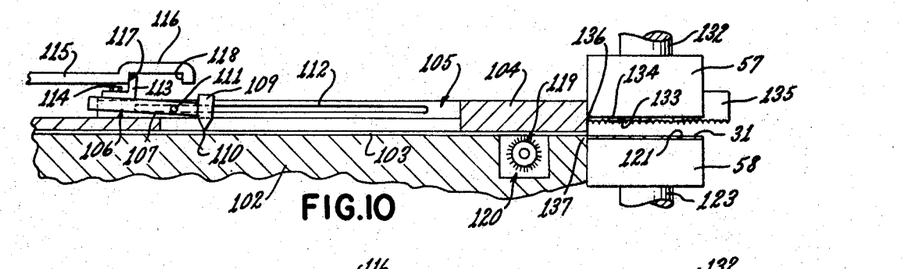
FIGURES 10–14 are views similar to FIGURE 9 and illustrate the apparatus of this invention in different operating positions thereof.
Figure 11:
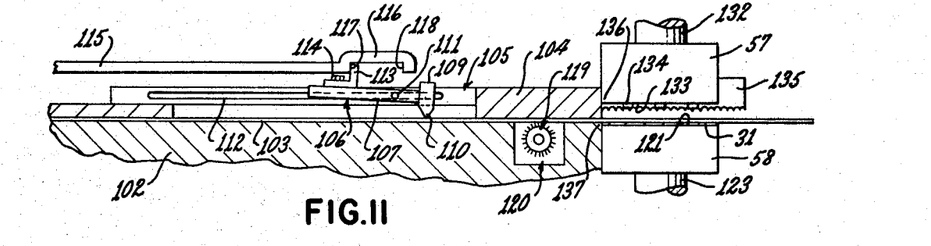

Further movement of the arm 115 from the position illustrated in FIGURE 10 to the position illustrated in FIGURE 11, causes the pushing members 109 to push the strips of lead material 103 to the right in unison therewith whereby the lead material 103 is pushed beyond the frame structure 102 and 104 and out between the die members 57 and 58 until the rightward movement of the arm 115 ceases.

At the same time that the arm 115 moves from the position illustrated in FIGURE 9 to the position illustrated in FIGURE 11, a wire brush 119, rotatably mounted in a cutout 120 of the frame means 102, is rotated to brush the under surfaces of the lead material 103 being advanced by the pusher 106 to facilitate the cold welding characteristics thereof.

However, when the arm 115 is moved from the position illustrated in FIGURE 11 back to the position illustrated in FIGURE 9, the rotation of the wire brush 119 can be terminated.

As the arm 115 moves back to the left, it can be seen that the surface 118 thereof eventually comes into contact with the L-shaped member 113 of the pusher 106 to cause counterclockwise rotation thereof whereby the ends 110 of the pushing members 109 are raised out of contact with the lead material 103 so that the same will not tend to move the lead material 103 to the left therewith.

Figures 14, 15:
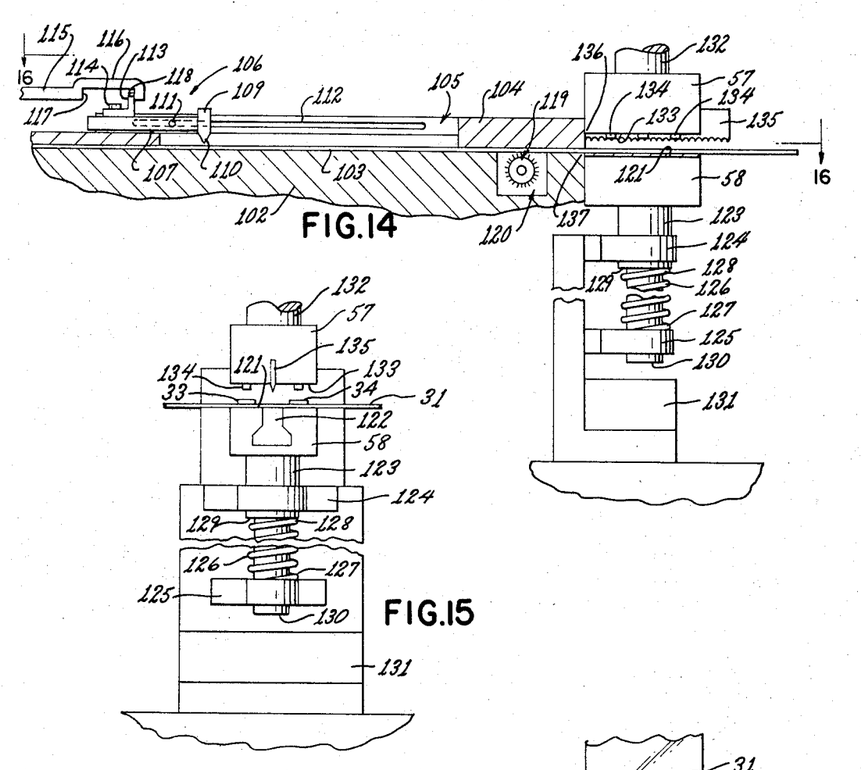
FIGURE 15 is an end view of the structure illustrated in FIGURE 14.

Thus, it can be seen that the arm 115 can return the pusher 106 back to the position illustrated in FIGURE 9 in the manner illustrated in FIGURE 14 to permit the same to advance the lead material 103 in the manner previously described at a subsequent time.

Further, it can be seen that by adjusting the L-shaped member 113 relative to the elongated portion 107 of the pusher 106 the desired quantity of lead material 103 pushed beyond the right hand ends of the frame members 102 and 104 can be adjusted to provide leads 33 and 34 of any desired lengths.

After the lead material 103 has been advanced to the right by the pusher 106 in the manner previously described, the die blocks 57 and 58 cooperate together to secure the lead material 103 to the strip of conductive material 31.

In particular, the die block 58 has a substantially flat upper surface 121 and is formed of metallic material or the like, the upper surface 121 of the die block 58 being medially interrupted and having a rubber insert 122 disposed therein for a purpose hereinafter described.

The die block 58 is carried on a shaft 123 movably mounted in a pair of brackets 124 and 125 secured to the frame structure 43 of the apparatus 38.

A compression spring 126 has one end 127 disposed against the lower bracket 125 and the upper end 128 thereof disposed against a shoulder 129 of the shaft 123 whereby the compression spring 126 continually urges the die block 58 to the position illustrated in FIGURE 15.

However, when the die block 58 is moved downwardly in a manner hereinafter described, downward movement of the die block 58 in opposition to the compression spring 126 is terminated when the end 130 of the shaft 123 engages a stationary block 131 in the manner illustrated in FIGURE 13.

The upper die block 57 is carried by a shaft 132 movable upwardly and downwardly by a suitable ram means operated pneumatically, hydraulically, or mechanically, as desired.

The upper die block 57 has a lower surface 133 provided with a plurality of projections 134 adapted to be disposed directly over the outwardly fed lead material 103 in the manner illustrated in FIGURE 14.

The upper die block 57 carries a perforating member 135 which projects beyond the surface 133 thereof and is located directly above the resilient member 122 of the lower die block 58 for a purpose hereinafter described.

Figures 12, 13:
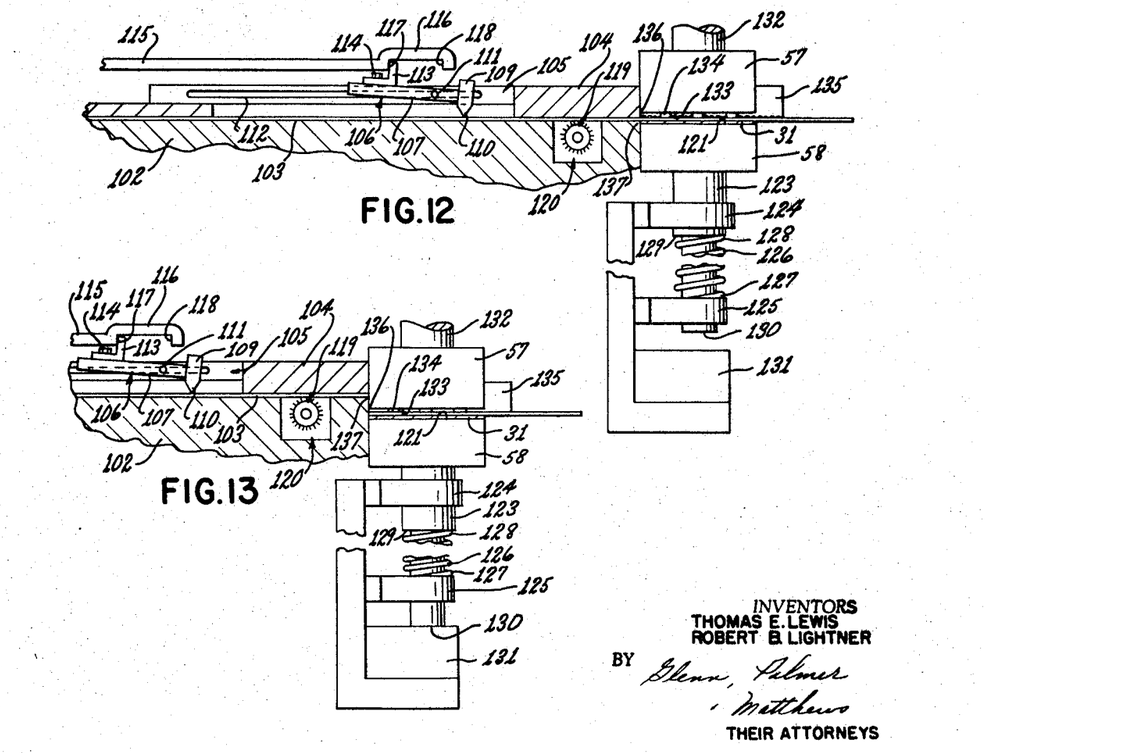

After the lead material 103 has been advanced to the right beyond the frame members 102 and 104 by the pusher 106 in the manner illustrated in FIGURE 11, the upper die block 57 is moved vertically downwardly in the manner illustrated in FIGURE 12, whereby it can be seen that the rear edge 136 of the upper die block 57 cooperates with the upper right hand corner 137 of the frame member 102 to cause shearing of the leads 33 and 34 from the lead material 103 in the manner illustrated in FIGURE 13, such downward movement of the upper die block 57 during the severing operation causing the lower die block 58 to move therewith in opposition to the force of the compression spring 126.

However, when the lower die block 58 bottoms out by having the end 130 of the shaft 123 thereof abut the stationary block 131 in the manner illustrated in FIGURE 13, further movement of the upper die block 57 downwardly causes the projections 134 thereof to cold weld the leads 33 and 34 to the strips of conductive material 31 in the manner illustrated in FIGURE 2. Simultaneously with the cold welding of the leads 33 and 34 to the strip of conductive material 31, the perforating member 135 punches through the strips of material 31 and 39 intermediate the leads 33 and 34 and is received in the resilient member 122 of the lower die member 58, whereby the perforated tear line 42, FIGURE 2, is formed in the superimposed strips of material 31 and 39 intermediate the leads 33 and 34 to render the strips of material 31 and 39 separable between the leads 33 and 34 for a purpose hereinafter described.

Thus, it can be seen that the die members 57 and 58 effectively secure the leads 33 and 34 to the strip of conductive material 31 after the die member 57 has separated the leads 33 and 34 from the strips of lead material 103 while at the same time perforate the strips of material 31 and 39 intermediate the leads 33 and 34.

Figure 20:
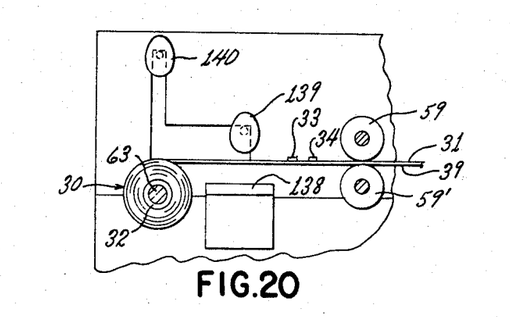
FIGURES 20–26 are fragmentary and schematic side views illustrating various steps of the apparatus of this invention for interconnecting the strip of conductive material in a serial manner to the cores of this invention.

After the leads 33 and 34 have been secured to the strips of conductive material 31 in the manner previously described, the same are advanced through the nip of the rollers 59 and 59' in the manner illustrated in FIGURE 20 until the same are directly above a table 138, the table 138 being stationary in the position illustrated in FIGURE 20 or being movable vertically upwardly and downwardly, if desired.

In any event, when the leads 33 and 34 are disposed in the position illustrated in FIGURE 21, a movable taping head 139 is moved vertically downwardly from the position illustrated in FIGURE 20 to the position illustrated in FIGURE 21 to not only hold the portion of the strips of material 31 and 39 carrying the lead 34 against the table 138 but to also apply one end of a piece of tape thereto to be utilized for a purpose hereinafter described.

Figure 21:
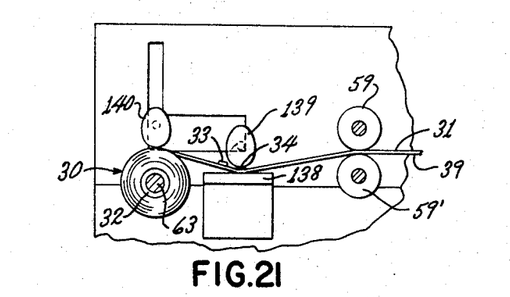

With the taping head 139 holding the lead 34 against the table 138 in the manner illustrated in FIGURE 21, another taping head 140 is moved from the position illustrated in FIGURE 20 down to the position illustrated in FIGURE 21 whereby the same applies one end of a piece of tape against the strip of conductive material 31.

Figure 22:
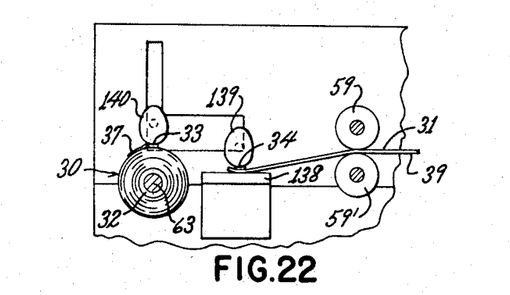
Figure 23:
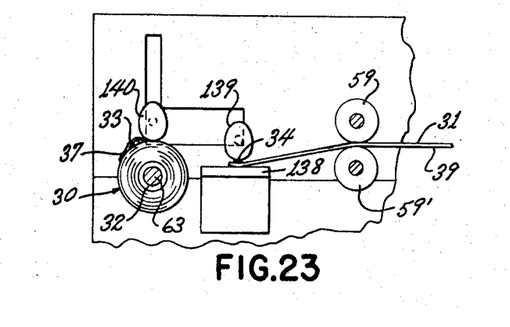

At this time the shaft 60 is again rotated in a counterclockwise direction whereby the strips of material 31 and 39 separate between the leads 33 and 34 at the table 138 as the lead 34 is held from movement toward the core 32 whereby the severed lead 33 is wound onto the coil 30 in the manner illustrated in FIGURE 22 to the position illustrated in FIGURE 23 as the taping head 140 applies the tape 37, FIGURE 1, thereto to complete the strip conductor coil 30 in the manner previously described. After the strip conductor coil 30 has been completed in the manner illustrated in FIGURE 23, the taping head 140 is moved vertically upwardly to the position illustrated in FIGURE 34, whereby the table 61 is indexed in the manner previously described to move the completed coil 30 to the station 68 while a new core 32 is moved to the station 67.

Figure 24:
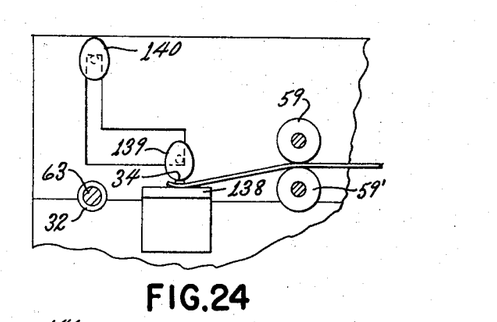
Figure 25:
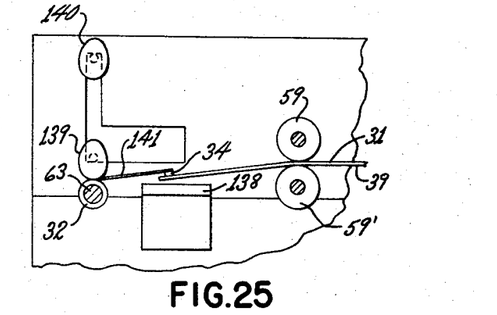
Figure 26:
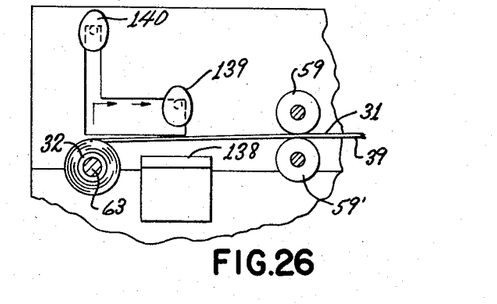

With the new core 32 moved to the station 67 in the manner illustrated in FIGURE 24, the taping head 139 moves from the position illustrated in FIGURE 24 to the position illustrated in FIGURE 25, whereby a length of tape 141 thereof extends from the lead 34 over to the core 32 to be secured to the core 32 when the taping head 139 severs the tape 141 therefrom and moves back to the position illustrated in FIGURE 26.

However, since the tape 141 is interconnecting the core 32 to the lead 34 on the strips of material 31 and 39 passing through the apparatus 38, subsequent rotation of the shaft 60 to cause counterclockwise rotation of the new core 32 causes the strips of material 31 and 39 to be drawn thereon whereby a new strip conductor coil 30 can be formed on the new core 32 in the manner previously described.

Thus, it can be seen that the apparatus 38 is adapted to continuously form the strip conductor coils 30 in an automatic manner without requiring any manual operation other than loading the cores 32 in the hopper means 70 and replacing the supply rolls 40 and 41 when the same have been spent.

While the apparatus 38 of this invention has been previously described as being fully automatic, it is to be understood that the table 61 and mandrels 63 could be eliminated whereby an operator could place a core 32 on the shaft 60 to be wound thereon in the manner previously described and can manually separate the strips of material 31 and 39 between the interconnected leads 33 and 34 when desired to complete a particular strip conductor coil 30 and can, thereafter, interconnect the lead 34 to a new core 32 to produce a new strip conductor coil 30, if desired.

Therefore, it can be seen that this invention provide improved apparatus for making strip conductor coils or the like.

While the form of the invention now preferred has been disclosed as required by the statutes, other forms may be used, all coming within the scope of the claims which follow.

What is claimed is:

1. Apparatus for making strip conductor coils having inner and outer leads connected thereto, said apparatus having a supply roll support for carrying a supply roll of strip conductor material, said apparatus having means for coiling a strip of conductive material from said supply roll thereof onto a core while said core is in a predetermined location in said apparatus, said apparatus having means for securing two leads in side-by-side relation to said strip intermediate said predetermined location and said supply roll support, said apparatus having means for perforating and tearing said strip between said leads at a point intermediate said predetermined location and said supply roll support whereby one of said leads will be adapted to form the outer lead on said core and the other of said leads will be adapted to form the inner lead on another core when said other core is at said predetermined location.

2. Aparatus as set forth in claim 1 wherein said securing means is adapted to cold weld said leads to said strip of material.

3. Apparatus as set forth in claim 1 wherein said first named means includes means for rotating said core while said core is in said predetermined location.

4. Apparatus as set forth in claim 1 wherein said means for coiling said strip of conductive material from said supply roll thereof onto said core includes means for coiling a strip of insulating material from a supply roll thereof intermediate the coils of said strip of conductive material on said core.

5. Apparatus as set forth in claim 1 wherein said means for feeding said two leads in side-by-side relation is adapted to feed said leads transverse to said strip intermediate said predetermined location and said supply roll support.

6. Apparatus as set forth in claim 1 wherein said means for feeding said two leads in side-by-side relation comprises means for feeding two strips of lead material transverse to said strip of conductive material until said strips of lead material project beyond said strip of conductive material a predetermined distance, and means for severing said projected lead material to form said two leads.

7. Apparatus as set forth in claim 6 wherein said means for feeding said lead material is adjustable to vary the length of said leads.

8. Apparatus for making strip conductor coils having inner and outer leads connected thereto, said apparatus having a supply roll support for carrying a supply roll of strip conductive material, said apparatus having means for coiling a strip of conductive matreial from said supply roll thereof onto a core while said core is in a predetermined location in said apparatus, said apparatus having means for feeding two strips of lead material transverse to said strip of conductive material intermediate said predetermined location and said supply roll support until said strips of lead material project beyond said strip of conductive material a predetermined distance, said apparatus having means for severing said projected lead material to form two leads, said apparatus having means for securing said two leads in side-by-side relation to said strip of conductive material intermediate said predetermined location and said supply roll, said apparatus having means for separating said strip between said leads at a point intermediate said predetermined location and said supply roll support whereby one of said leads will be adapted to form the outer lead on said core and the other of said leads will be adapted to form the inner lead on another core when said other core is at said predetermined location, said apparatus having means to brush the conductive strip engaging surface of said lead material before said lead material forms said leads.

9. Apparatus for making strip conductor coils having inner and outer leads connected thereto, said apparatus having a supply roll support for carrying a supply roll of strip conductive material, said apparatus having means for coiling a strip of conductive material from said supply roll thereof onto a core while said core is in a predetermined location in said apparatus, said apparatus having means for securing two leads in side-by-side relation to said strip intermediate said predetermined location and said supply roll support, said apparatus having means for separating said strip between said leads at a point intermediate said predetermined location and said supply roll support whereby one of said leads will be adapted to form the outer lead on said core and the other of said leads will be adapted to form the inner lead on another core when said other core is at said predetermined location, said means for securing said two leads in side-by-side relation to said strip of conductive material comprising a first die block, said coiling means being adapted to feed said strip of conductive material relative to said first die block, means for feeding two strips of lead material transverse to said strip of conductive material until said lead material projects beyond said conductive material a predetermined distance, and a second movable die block movable toward said first die block to sever said projecting lead material to form two leads and cold weld said leads to said strip of conductive material whereby said one lead will form the outer lead on said core and said other lead will form the inner lead on said other core.

10. Apparatus as set forth in claim 9 wherein said second die block cooperates with said first die block block to perforate said strip of conductive material between said secured leads.

11. Apparatus as set forth in claim 9 wherein said first die block is spring loaded.

12. Apparatus for continuously making strip conductor coils having inner and outer leads connected thereto, said apparatus having a supply roll carrying a supply roll of strip conductive material, said apparatus having means for positioning a core in a predetermined location in said apparatus, said apparatus having means for coiling a strip of conductive material from said supply roll thereof onto said core while said core is at said predetermined location, said apparatus having means for securing two leads in side-by-side relation to said strip intermediate said predetermined location and said supply roll support, said apparatus having means for separating said strip between said leads at a point intermediate said predetermined location and said supply roll support whereby one of said leads will be adapted to form the outer lead on said core and the other lead will be adapted to form the inner lead on another core when said other core is at said predetermined location, said apparatus having means to position said other core at said predetermined location after said first-named core is moved from said predetermined location, said apparatus having means to interconnect the portion of said strip having the other lead thereon to said other core when said other core is at said predetermined location so that another strip conductor coil can be formed on said other core in the above manner.

13. Apparatus as set forth in claim 12 wherein said apparatus has means to secure the portion of said strip having said one lead to said first-named core when said first-named core is at said predetermined location.

14. Apparatus as set forth in claim 13 wherein said last-named means includes a taping apparatus.

15. Apparatus as set forth in claim 12 wherein said last-named means includes a taping apparatus.

16. Apparatus for continuously making strip conductor coils having inner and outer leads connected thereto, said apparatus having a supply roll support for carrying a supply roll of strip conductive material, said apparatus having a plurality of indexible mandrels, one of said mandrels having means to retain a core thereon, said apparatus having indexing means to index said one mandrel relative to said apparatus to move said core carried thereby to a predetermined location relative to said apparatus, said apparatus having means for coiling a strip of conductive material from said supply roll thereof onto said core while said core is at said predetermined location, said apparatus having means for securing two leads in side-by-side relation to said strip intermediate said one mandrel when at said predetermined location and said supply roll support, said apparatus having means for separating said strip between said leads at a point intermediate said predetermined location and said supply roll support whereby one lead is adapted to form the outer lead on said core and the other lead will be adapted to form the inner lead on another core, said indexing means being adapted to move said one mandrel to move said coiled core from said predetermined location while moving another core carrying mandrel to said predetermined location, said apparatus having means to interconnect the portion of said strip having said other lead thereon to said other core while said other core is in said predetermined location so that another strip conductor coil can be formed on said other core in the above manner.

17. Apparatus as set forth in claim 16 wherein said apparatus has means to rotate each mandrel when said mandrel positions said core in said predetermined location to cause said strip to wind on the respective core.

18. Apparatus as set forth in claim 16 wherein said apparatus has means for automatically feeding a core onto each mandrel before that mandrel is moved to said predetermined location.

19. Apparatus as set forth in claim 16 wherein said apparatus has means for automatically removing said coiled core from its respective mandrel when said respective mandrel is moved from said predetermined location.

20. Apparatus as set forth in claim 19 wherein said last-named means removes said coiled core when said mandrel is at one station of said apparatus if said coiled core is a reject and removes said coiled core when said mandrel is at another station of said apparatus if said coiled core is not a reject.

21. Apparatus for making strip conductor coils each having at least one lead connected thereto, said apparatus having a supply roll support for carrying a supply roll of strip conductor material, said apparatus having means for coiling a strip of conductive material from said supply roll thereof onto a core while said core is in a predetermined location in said apparatus, said apparatus having means for securing a lead to said strip intermediate said predetermined location and said supply roll support while simultaneously forming separation means on said strip adjacent said lead, said apparatus having means for separating said strip at said separation means at a point intermedite said predetermined location and said supply roll support to define two adjacent ends of said strip with one of said ends carrying said lead whereby one of said ends will be adapted to form the outer end of said coil on said core and the other of said ends will be adapted to form the inner end of another coil on another core when said other core is at said predetermined location.

22. Apparatus as set forth in claim 21 wherein said securing means is adapted to cold weld said lead to said strip of material.

23. Apparatus as set forth in claim 21 wherein said means for separating said strip includes means for tearing said strip at said separation means.

24. Apparatus as set forth in claim 21 wherein said means for forming said separation means on said strip comprises means to perforate said strip adjacent said lead.

References Cited

UNITED STATES PATENTS

| | | | |
|---|---|---|---|
| 2,333,966 | 11/1943 | Weiss | 242—56.1 X |
| 2,390,174 | 11/1945 | Roemer | 140—112 X |
| 2,610,390 | 9/1952 | Locke | 29—155.55 |
| 2,710,441 | 6/1955 | Heyman | 242—56.1 X |
| 2,946,727 | 7/1960 | Wellington | 242—56.1 X |
| 3,133,981 | 5/1964 | Seele | 264—261 |
| 3,226,803 | 1/1966 | Samuels | 29—419 |
| 3,234,063 | 2/1966 | Masini | 29—155.57 X |
| 3,234,628 | 2/1966 | Frekko | 29—25.42 |

FOREIGN PATENTS

| | | |
|---|---|---|
| 825,900 | 12/1959 | Great Britain. |

JOHN F. CAMPBELL, *Primary Examiner.*

R. W. CHURCH, *Assistant Examiner.*

U.S. Cl. X.R.

156—511, 516; 29—470.1, 25.41, 413, 25.42, 417, 203, 619, 605, 628; 219—56; 140—112; 113—119; 242—56.1